United States Patent
Ban

(10) Patent No.: US 7,460,989 B2
(45) Date of Patent: Dec. 2, 2008

(54) METHOD AND APPARATUS FOR MODELING MULTIPLE CONCURRENTLY DISPATCHED INSTRUCTION STREAMS IN SUPER SCALAR CPU WITH A SEQUENTIAL LANGUAGE

(75) Inventor: Oliver Keren Ban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 10/965,153

(22) Filed: Oct. 14, 2004

(65) Prior Publication Data

US 2006/0100843 A1     May 11, 2006

(51) Int. Cl.
  G06F 7/62    (2006.01)
  G06F 15/16   (2006.01)
  G06F 15/00   (2006.01)
  G06F 1/12    (2006.01)
  G06F 1/04    (2006.01)
  G06F 11/00   (2006.01)

(52) U.S. Cl. .............. 703/17; 709/248; 712/8; 712/9; 712/22; 712/23; 713/400; 713/600; 714/11; 714/12; 714/707; 714/741

(58) Field of Classification Search .......... 703/17; 712/8, 9, 22, 23; 709/248; 713/400, 600; 714/11, 12, 707, 741

See application file for complete search history.

(56) References Cited

U.S. PATENT DOCUMENTS 5,179,672 A * 1/1993 Genduso et al. ............ 713/600
5,886,899 A * 3/1999 Stapleton ................... 716/6
6,381,692 B1 * 4/2002 Martin et al. ............... 712/244

OTHER PUBLICATIONS

Bumble, Marc. "A Parallel Architecture for Non-Deterministic Discrete Event Simulation", 2001.*
Brandolese et al. "Discrete-Event Modeling and Simulation of Superscalar Microporcessor Architectures" 2004.*
Funther, Bernard. "SuperScalar Performance in an Multithreaded Microprocessor" Dec. 1993.*
Patsis et al. "SIMD Parallel Discrete-Event Dynamic System Simulation" IEEE Transactions on Control Systems Technology, vol. 5, No. 1, Jan. 1997.*
Kimura et al. "Building a Design Support Tool for Superscalar Processors and Its Case Studies" Systems and Computer in Japan, vol. 32 No. 12, 2001.*

* cited by examiner

Primary Examiner—Kamini Shah
Assistant Examiner—Shambhavi Patel
(74) Attorney, Agent, or Firm—Duke W. Yee; Gregory M. Doudnikoff; James O. Skarsten

(57) ABSTRACT

A method is provided, wherein a virtual internal master clock is used in connection with a RISC CPU. The RISC CPU comprises a number of concurrently operating function units, wherein each unit runs according to its own clocks, including multiple-stage totally unsynchronized clocks, in order to process a stream of instructions. The method includes the steps of generating a virtual model master clock having a clock cycle, and initializing each of the function units at the beginning of respectively corresponding processing cycles. The method further includes operating each function unit during a respectively corresponding processing cycle to carry out a task with respect to one of the instructions, in order to produce a result. Respective results are all evaluated in synchronization, by means of the master clock. This enables the instruction processing operation to be modeled using a sequential computer language, such as C or C++.

20 Claims, 3 Drawing Sheets

METHOD AND APPARATUS FOR MODELING MULTIPLE CONCURRENTLY DISPATCHED INSTRUCTION STREAMS IN SUPER SCALAR CPU WITH A SEQUENTIAL LANGUAGE

BACKGROUND OF THE INVENTION

1. Technical Field

The invention disclosed and claimed herein generally relates to a method and apparatus for using a specified computer language to model a super scalar central processing unit (CPU). More particularly, the invention pertains to a method of the above type wherein operation of the CPU is characterized by a concurrently dispatched instruction stream, and the specified language is a sequential language such as C or C++. Even more particularly, the invention pertains to a method of the above type, wherein multiple concurrently operating functional units contained in the CPU are respectively synchronized to a virtual model master or base clock.

2. Description of Related Art

As is known by those of skill in the art, a Reduced Instruction Set Computer (RISC) is a microprocessor that is designed to perform a reduced number of types of computer instructions. This enables the microprocessor to operate at a higher speed. In the current super scalar RISC CPU design environment, a major problem is the verification of multiple dispatched Signal Instruction Multiple Data (SIMD) instruction streams. More particularly, a typical super scalar RISC CPU comprises a complicated concurrent operational machine, wherein every block unit functions simultaneously. Moreover, the internal timing of a RISC CPU is typically in accordance with a multiple stage pipelined operation.

It would be very desirable to use sequential language, such as C or C++, to model the multiple dispatched instruction stream of a RISC CPU. This could provide a useful tool for the verification of multiple dispatched SIMD instructions streams. However, the sequential nature of these types of compiled languages makes it rather difficult to use them to model the concurrent events that take place within a super scalar CPU. The concurrency problem is complicated by the addition of floating point instruction streams, since the floating point unit (FPU) in the CPU has separated instruction queues and execution engines. In addition, since the internal timing of the RISC CPU operates in the mode of a multiple stage pipelined operation, as noted above, the sequential execution nature of a compiled model language such as C or C++ cannot correctly model the CPU operation, with acceptable precision or accuracy to the clock standard.

SUMMARY OF THE INVENTION

Embodiments of the invention provide a solution to the above problem, based on the creation of an internal synchronization clock mechanism. The RISC CPU comprises a number of concurrently operating function units, or function blocks, wherein each unit runs according to its own clocks, including multiple-staged totally unsynchronized clocks. By means of the invention, a virtual internal master clock may be inserted into the multiple pipelined machine cycle, which is used to model operation of the RISC CPU function units as described above. In one useful embodiment, the invention is directed to a processor comprising a plurality of function units disposed to operate concurrently, in order to process a stream of instructions. The embodiment comprises a method for enabling the instruction processing operation to be modeled using a sequential computer language, such as C or C++. The method comprises the steps of generating a virtual model master clock having a clock cycle, and initializing each of the function units at the beginning of respective corresponding processing cycles. The method further comprises operating each function unit during a respectively corresponding processing cycle to carry out a task with respect to one of the instructions, in order to produce a result. The results provided by the respective function units are all evaluated at the same time, as defined by a specified position of one of the clock cycles. Each of the evaluated results provided by a function unit is written into a corresponding register, together with the time defined by the specified clock cycle position.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
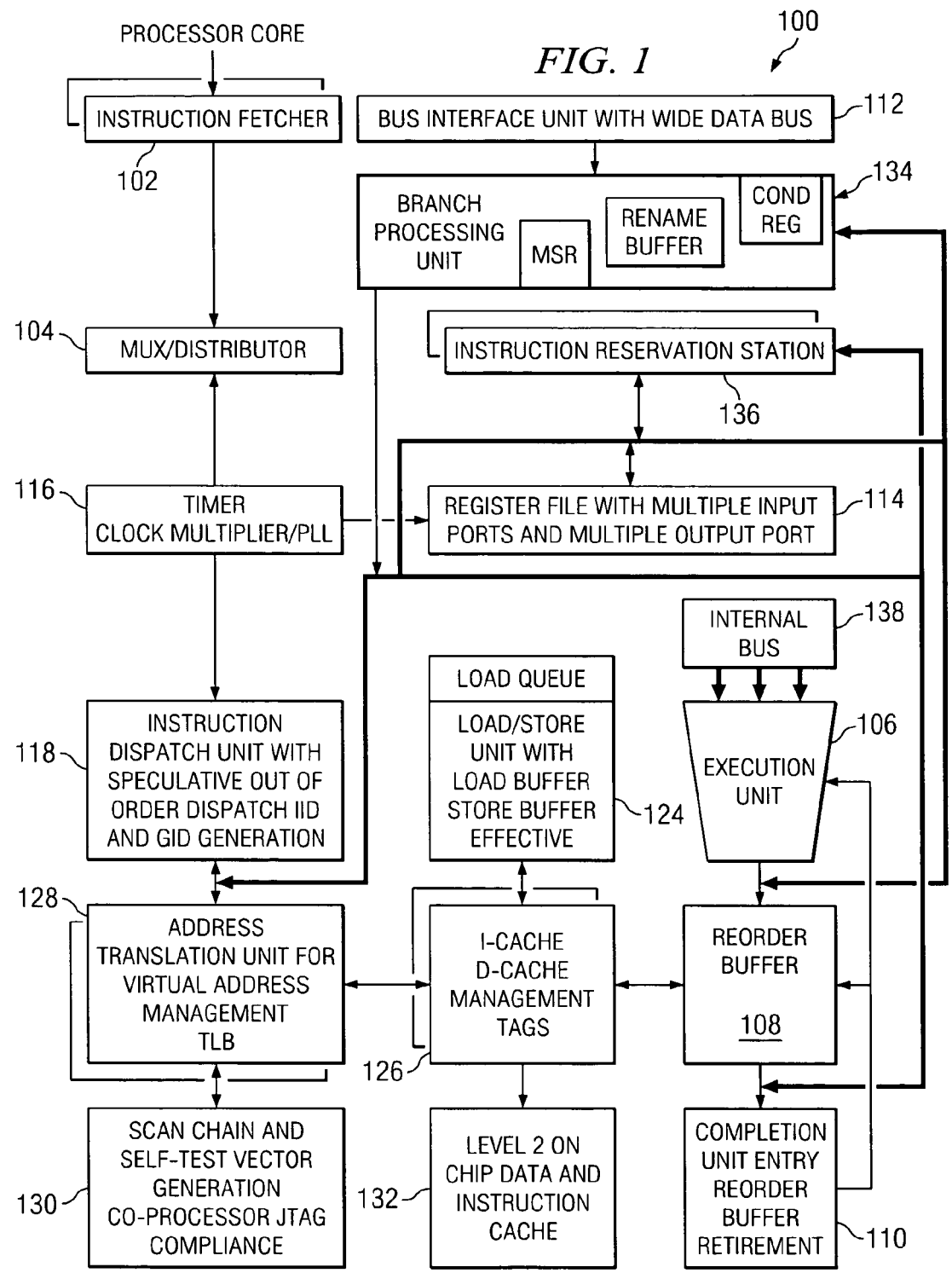
FIG. 1 is a block diagram showing a super scalar CPU used in connection with an embodiment of the invention.

Referring to FIG. 1, there is shown a super scalar RISC CPU 100, implemented as an arrangement of concurrently operating function blocks or function units. The function units include an instruction fetcher 102, a multiplexer/distributor 104 and an execution unit 106. A reorder buffer 108 and a completion unit entry reorder buffer 110 collectively serve as a completion buffer. The interaction of function units 102-110 of FIG. 1, together with bus interface unit 112 and register file 114, are described hereinafter in further detail.

Referring further to FIG. 1, there is shown a timer 116 and an instruction dispatch unit 118 connected to multiplexer 104 for use in dispatching instructions. There is also shown a load/store unit 124 inter-connected to I-Cache/D-Cache 126, and address translation unit 128, a co-processor 130 and a cache 132. The RISC CPU 100 further includes a branch processing unit 134, an instruction reservation station 136 and an internal bus 138.

The division of function units or blocks in the implementation shown in FIG. 1 is based on functionality separation. Another consideration is processor internal bus boundary. In view of these considerations, processor micro-architecture is divided into an integer execution unit IEU, a floating point unit FPU, a bus interface unit BIU, an instruction fetch unit IFU, a floating point register file FPRF, and an integer register file IRF, together with some other blocks shown in FIG. 1.

Figure 2:
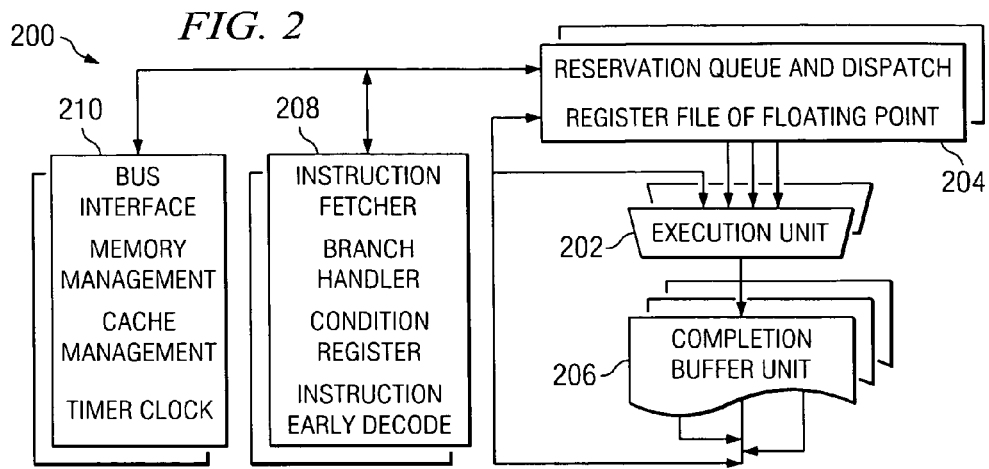
FIG. 2 is a block diagram showing an execution unit for the CPU of FIG. 1.

The concurrency problem is complicated by the addition of a floating point instruction stream, since the FPU has separated instruction queues and execution engines. This is illustrated by FIG. 2, showing a typical flowing point or integer execution unit 200. More particularly, FIG. 2 shows an execution unite 202 receiving an input from a reservation queue and dispatch/register file 204, and providing an output to a completion buffer unit 206. FIG. 2 further shows a group of functions 208, including instruction fetcher, as well as a group of functions 210, both groups being coupled to unit 204.

Figure 3:
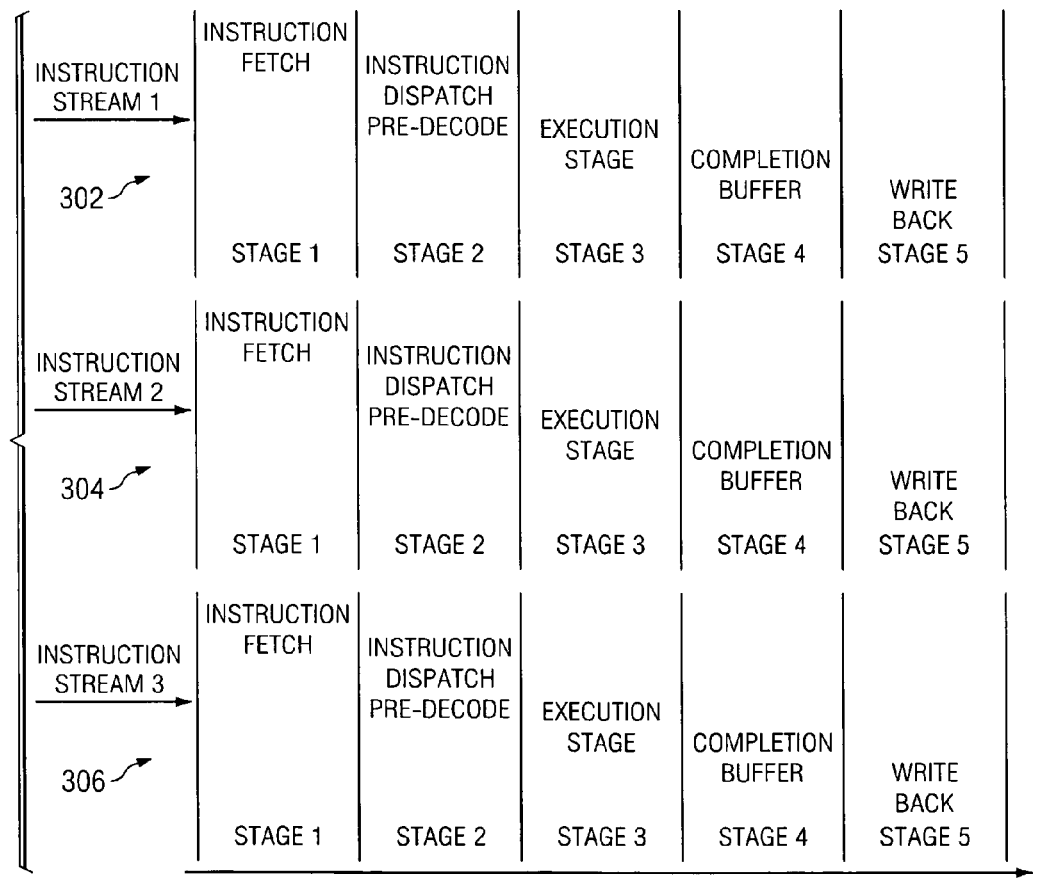
FIG. 3 is a schematic diagram showing a multiple stage pipelined operation sequence that illustrates operation of the CPU of FIG. 1.

Execution of an instruction in the RISC CPU shown in FIG. 1 proceeds in accordance with a multiple stage pipelined operation sequence. Referring to FIG. 3, there are shown pipelined stages 1-5, wherein the number of stages is limited to five (5) for simplicity. Moreover, multiple instructions may be processed at the same time during an execution sequence. Accordingly, FIG. 3 shows three separate pipelined operations 302-306, wherein the three pipelined operations are used to concurrently process three different streams of instructions, denoted as instruction streams 1-3, respectively.

Referring further to FIG. 3, there is shown an instruction fetch operation performed during each stage 1 of the pipelined sequences. This function is carried out by the instruction fetcher unit 102 of RISC CPU 100. During each stage 2, the instruction fetched during the immediately preceding stage 1 is dispatched and pre-decoded. This function is carried out by multiplexer/distributor.

At stage 3, each instruction dispatched during the preceding stage is executed, by means of execution unit 106 of RISC CPU 100. Results of each execution are entered into a completion buffer, comprising function units 108 and 110, during stage 4. During stage 5, the buffer results are written back into register 114, by means of bus interface unit 112.

In the above pipelined operation, every function unit inside the RISC processor 100 can be running concurrently according to its own clocks, and clocks of the multiple stages may be unsynchronized with one another. Moreover, in the multiple stage pipelined arrangement, multiple instruction-type instruction streams are being fed into the concurrently operating function units, or blocks, of the RISC CPU 100. However, as noted above, the sequential execution nature of the compiled model language, such as C or C++, cannot correctly model the CPU operation with sufficient precision or accuracy to the clock standard. Accordingly, an embodiment of the invention defines a virtual model base or master clock. Usefully, the model master clock is defined as a 50% duty cycle clock, and has a frequency that is either equal to or an integer number of the highest clock frequency of the respective function units included in RISC CPU 100.

Figure 4:
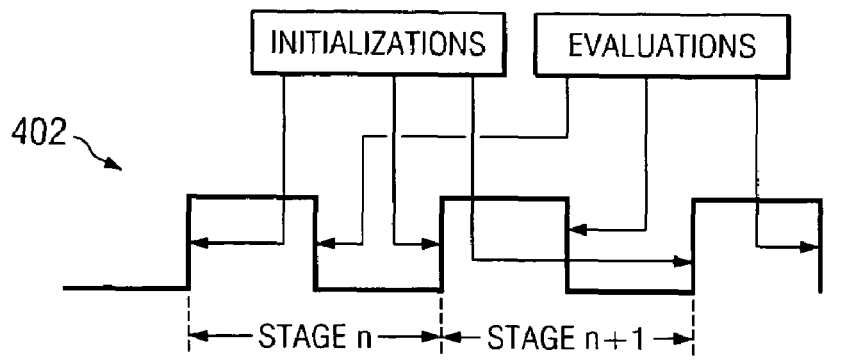
FIG. 4 is a schematic diagram showing a synchronization clock cycle generated by a virtual model master clock, in accordance with an embodiment of the invention.

Referring to FIG. 4, there is shown the model master clock having a clock cycle 402. Moreover, for simplicity, there is shown respective stages of the pipelined sequence each having a time period of one clock cycle of the master clock. Thus, each function unit of CPU 100 that is operable during each of the stages 1-5 likewise has a period of one clock cycle. As described hereinafter in further detail, the rising edge of the master clock cycle is used to initialize the associated function unit, and the falling edge is used to evaluate the result produced by the function unit.

While different functions or tasks are performed during the different stages of the pipelined operation sequence, the same set of procedural steps is carried out during each stage. These steps include (1) initialization; (2) task performance; (3) evaluation; and (4) result entry. These steps are respectively shown as function blocks 502-508 of FIG. 5, which comprises a flow chart.

At an initialization for a stage n, the output or result provided by the previous stage is read from a pipeline register. As stated above, initialization of each stage coincides with the rising edge of the master clock pulse. If the output read from the register is seen to be erroneous, a restart operation will take place, to flush or clear the pipeline.

During the task performance step 504, the output of the preceding step is processed, in accordance with the function unit associated with the particular stage n. Thereafter, an evaluation function 506 is applied to the result or output of the task performance step. As stated above, evaluation is concurrent, or synchronized with, the falling edge of the master clock pulse.

Figure 5:
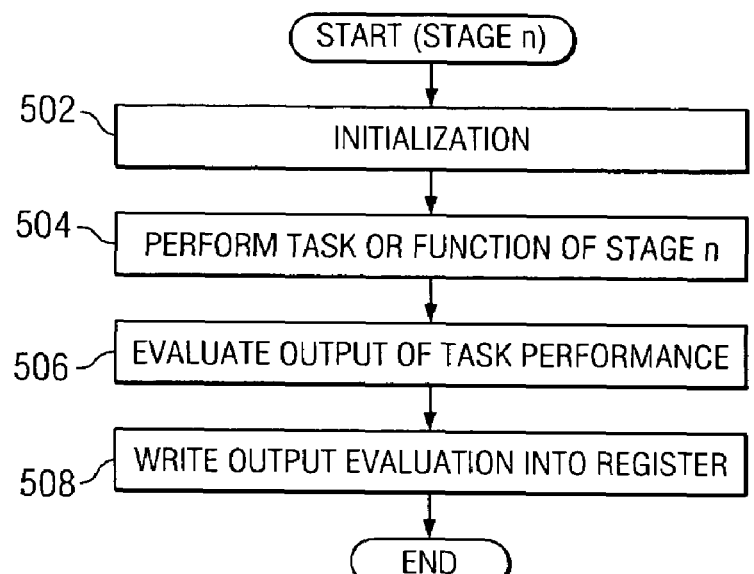
FIG. 5 is a flow chart showing respective steps in a pipelined stage for an embodiment of the invention.

Referring further to FIG. 5, there is shown function block 508 indicating that the evaluated output of the stage n is written into the pipeline register. The written information includes the evaluation, and is therefore synchronized to the master clock.

By calling the evaluation function of every function unit at the falling edge of the master clock, during each stage, all the different function units that are running according to different stage clocks are synchronized according to the model master clock. As a result, respective function units, or function blocks, can be modeled in a sequential computer language according to the sequence of the execution or dispatch of the instruction stream.

Figure 6:
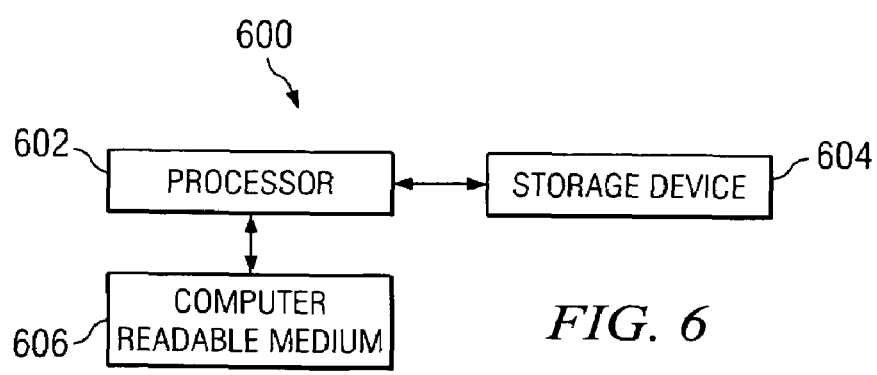
FIG. 6 is a block diagram showing a simplified arrangement for use in implementing an embodiment of the invention.

Referring to FIG. 6, there is shown a simplified processing system 600 for implementing an embodiment of the invention. System 600 generally comprises a processor 602, a storage device 604, such as a database or the like, and a computer readable medium 606. The processor 602 may selectively be the same processor as processor 100 shown in FIG. 1, or may be a different processor. Computer readable medium 606 may be any suitable device, such as instruction cache 132 of FIG. 1, that can selectively store instructions, and can also enable stored instructions to be read by a computer related device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a processor comprising a plurality of function units, wherein each function unit is provided with its own unit clock, and said function units are operated concurrently to process a stream of instructions, a method for enabling the processing of said instructions to be modeled using a sequential computer language, said method comprising the steps of;

generating a model master clock having a master clock cycle;

initializing each of said function units at the beginning of respectively corresponding processing cycles;

operating each function unit during its corresponding processing cycle to carry out a task with respect to one of said instructions, in order to produce a task result, wherein said function units are operated concurrently with one another, each according to its own unit clock, and said unit clocks are unsynchronized with one another;

completing the processing cycles of all of said function units at the same specified time, as defined by a specified position of one of said master clock cycles, by selectively evaluating the task results respectively produced by each of said function units; and writing each of said evaluated results produced by said function units, together with said specified time defined by said specified master clock cycle position, into registers respectively corresponding to said task results.

2. The method of claim 1, wherein:
said function units operate concurrently to process said instruction stream, in accordance with a multiple stage pipelined machine cycle.

3. The method of claim 2, wherein:
said completing step is carried out concurrently with a falling edge of one of said clock cycles.

4. The method of claim 3, wherein:
said processor is adapted to process a plurality of instruction streams, each in accordance with one of a plurality of concurrent multiple stage pipelined operations.

5. The method of claim 3, wherein:
said initializing step includes reading specified registers respectively corresponding to said function units.

6. The method of claim 5, wherein:
said method selectively includes a register clearing operation following said register reading.

7. The method of claim 5, wherein:
said processor comprises a Reduced Instruction Set Computer processor.

8. The method of claim 7, wherein:
said computer language comprises C or C++, selectively.

9. A computer program product in a computer readable medium for enabling the processing of a stream of instructions to be modeled using a sequential computer language, wherein the instructions are processed by means of a processor comprising a plurality of concurrently operating function units, each function unit being provided with its own unit clock, said computer program product comprising:

first instructions for generating a model master clock having a master clock cycle;

second instructions for initializing each of said function units at the beginning of respectively corresponding processing cycles;

third instructions for operating each function unit during its corresponding processing cycle to carry out a task with respect to one of said instructions, in order to produce a task result, wherein said function units are operated concurrently with one another, each according to its own unit clock, and said unit clocks are unsynchronized with one another;

fourth instructions for completing the processing cycles of all of said function units at the same specified time, as defined by a specified position of one of said master clock cycles, by selectively evaluating the task result results respectively produced by each of said function units; and fifth instructions for writing each of said evaluated results produced by said function units, together with said specified time defined by said specified master clock cycle position, into registers corresponding to said task results.

10. The computer program product of claim 9, wherein:
said function units operate concurrently to process said instruction stream, in accordance with a multiple stage pipelined machine cycle.

11. The computer program product of claim 10, wherein:
said evaluation is carried out concurrently with a falling edge of one of said clock cycles.

12. The computer program product of claim 11, wherein:
said processor is adapted to process a plurality of instruction streams, each in accordance with one of a plurality of concurrent multiple state pipelined operations.

13. The computer program product of claim 12, wherein:
said processor comprises a Reduced Instruction Set Computer processor.

14. The computer program product of claim 13, wherein:
said computer language comprises C or C++, selectively.

15. A computer system comprising:
a processor comprising a plurality of function units, wherein each function unit is provided with its own unit clock, and said function units are operated concurrently to process a stream of instructions; and a computer readable medium connected to the processor, said medium including further processor instructions configured to be read by said processor and to thereby cause said processor to:

generate a model master clock having a master clock cycle;

initialize each of said function units at the beginning of respectively corresponding processing cycles;

operate each function unit during its corresponding processing cycle to carry out a task with respect to one of said instructions of said instruction stream, in order to produce a task result, wherein said function units are operated concurrently with one another, each according to its own unit clock, and said unit clocks are unsynchronized with one another;

complete the processing cycles all of said function units at the same specified time as defined by a specified position of one of said master clock cycles, by selectively evaluating the task results respectively produced by each of said function units; and write each of said evaluated results produced by said function units, together with said specified time defined by said specified master clock cycle position, into registers respectively corresponding to said task results, so that processing of said instruction stream can be modeled using a sequential computer language.

16. The system of claim 15, wherein:
said function units operate concurrently to process said instruction stream, in accordance with a multiple stage pipelined machine cycle.

17. The system of claim 16, wherein:
said evaluation of results is carried out concurrently with a falling edge of one of said clock cycles.

18. The system of claim 17, wherein:
said processor is adapted to process a plurality of instruction streams, each in accordance with one of a plurality of concurrent multiple stage pipelined operations.

19. The system of claim 18, wherein:
said processor comprises a Reduced Instruction Set Computer processor.

20. The system of claim 19, wherein:
said computer language comprises C or C++, selectively.

* * * * *